(12) United States Patent
Iwai et al.

(10) Patent No.: US 8,208,579 B2
(45) Date of Patent: Jun. 26, 2012

(54) RADIO TRANSMITTING APPARATUS, RADIO RECEIVING APPARATUS, AND DATA PLACING METHOD

(75) Inventors: Takashi Iwai, Ishikawa (JP); Daichi Imamura, Kanagawa (JP); Sadaki Futagi, Ishikawa (JP); Atsushi Matsumoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 467 days.

(21) Appl. No.: 12/066,785

(22) PCT Filed: Sep. 15, 2006

(86) PCT No.: PCT/JP2006/318416
§ 371 (c)(1),
(2), (4) Date: Apr. 16, 2010

(87) PCT Pub. No.: WO2007/032492
PCT Pub. Date: Mar. 22, 2007

(65) Prior Publication Data
US 2010/0290543 A1   Nov. 18, 2010

(30) Foreign Application Priority Data
Sep. 16, 2005  (JP) .................................. 2005-270423

(51) Int. Cl.
*H04L 27/00* (2006.01)
(52) U.S. Cl. ........................................ 375/295; 375/259
(58) Field of Classification Search .................. 375/259, 375/295
See application file for complete search history.

(56) References Cited

U.S. PATENT DOCUMENTS

| | | | |
|---|---|---|---|
| 6,628,723 B1 * | 9/2003 | Gerlach et al. | 375/259 |
| 6,775,260 B1 * | 8/2004 | Dabak et al. | 370/342 |
| 7,016,425 B1 * | 3/2006 | Kraiem | 375/261 |
| 2004/0100937 A1 * | 5/2004 | Chen | 370/345 |
| 2006/0195756 A1 | 8/2006 | Yoshii | |

(Continued)

FOREIGN PATENT DOCUMENTS
EP   1 628 410   2/2006
(Continued)

OTHER PUBLICATIONS
Japanese Office Action dated May 10, 2011.
(Continued)

*Primary Examiner* — Shuwang Liu
*Assistant Examiner* — David Huang
(74) *Attorney, Agent, or Firm* — Dickinson Wright PLLC

(57) ABSTRACT

A radio transmitting apparatus wherein when both a first data and a second data, which has a greater importance than the first data, are placed in a single block, the BER characteristic of the second data can be well maintained. In this apparatus, a modulating part (101-1) modulates a first data sequence to generate a first data symbol, while a modulating part (101-2) modulates a second data sequence to generate a second data symbol. A placing part (102) places both the first data symbol and the second data sequence in each of blocks constituting a single carrier signal. At this moment, the placing part (102) places, in the single block, the first data at both ends of the block, while placing the second data, which has the greater importance than the first data, at the center of the block. A CP adding part (103) adds, to the head of the block in which the first and second data symbols are placed, a rear end portion of that block as CP.

6 Claims, 13 Drawing Sheets

U.S. PATENT DOCUMENTS

2008/0019263 A1* 1/2008 Stolpman .................. 370/210

FOREIGN PATENT DOCUMENTS

| | | |
|---|---|---|
| JP | 08-163012 | 6/1996 |
| JP | 2004-282207 | 10/2004 |
| JP | 2004-304268 | 10/2004 |
| JP | 2004-349889 | 12/2004 |

OTHER PUBLICATIONS

International Search Report dated Dec. 19, 2006.
D. Falconer, et al., "Frequency Domain Equalization for Single-Carrier Broadband Wireless Systems," IEEE Communications Magazine, vol. 40, Issue 4, Apr. 2002, pp. 58-66.

* cited by examiner

RADIO TRANSMITTING APPARATUS, RADIO RECEIVING APPARATUS, AND DATA PLACING METHOD

TECHNICAL FIELD

The present invention relates to a radio transmitting apparatus, a radio receiving apparatus and data mapping method.

BACKGROUND ART

To realize a data rate over 100 Mbps for next generation mobile communication systems, various wireless communication methods adequate to high-speed packet transmission are considered. Frequency bands to be used need to be wider for realizing that high-speed transmission and around 100 MHz band is considered for use.

It is known that, if such wide band transmission is performed in mobile communication, a communication channel is a frequency selective channel comprised of a plurality of paths with respective delay times. Therefore, in wide band transmission in mobile communication, intersymbol interference (hereinafter "ISI") where a symbol interferes to the following symbol is caused and bit error rate (hereinafter "BER") performances are degraded. Further, in a frequency selective channel, the channel transfer function varies in the frequency band, resulting in spectrum distortion of signals received via this channel.

There is an equalization technique for removing the influence of ISI and improving the BER performances. To be more specific, maximum likelihood sequence estimation (hereinafter "MLSE") is known as a time domain equalization technique. However, in MLSE, the structure of an equalizer becomes complicated with an increase of the number of paths significantly, and the amount of calculation for equalization increases exponentially. Consequently, as an equalization technique where the structure of an equalizer does not depend on the number of paths, frequency domain equalization (hereinafter "FDE") has attracted attention recently (for example, see Non-Patent Document 1).

In FDE, a received signal block is divided into orthogonal frequency components by the fast Fourier transform (hereinafter "FFT"), and these frequency components are multiplied with equalization weights approximate to the reciprocal of the channel transfer function, and converted into time domain signals by the inverse fast Fourier transform (hereinafter "IFFT"). By this FDE, it is possible to compensate spectrum distortion of received signals, and, as a result, ISI is decreased and the BER performances are improved. Further, in equalization weights, minimum mean square error (hereinafter "MMSE") weight, which minimizes the mean square error of the frequency component and the transmission signal component subjected to equalization, provides the best BER performances.

In the technique disclosed in above-described Non-Patent document 1, a received signal needs to be provided as a repeat signal with the FFT block length, and, consequently, the same signal as the tail part of a symbol is attached to the head of the symbol block as cyclic prefix (hereinafter "CP") on the transmitting side. Further, by providing CP, it is possible to prevent ISI as long as the delay time of delay waves stays within the time length of CP (hereinafter "CP length"). Here, CP may be referred to as a guard interval (hereinafter "GI").

Non-Patent Document 1: D. Falconer, S.L. Ariyavistakul, A. Benyamin-Seeyar, and B. Eidson, "Frequency domain equalization for single-carrier broadband wireless systems", IEEE Commun. Mag., vol. 40, pp. 58-66, April 2002

DISCLOSURE OF INVENTION

Problems to be Solved by the Invention

However, if there are delay waves with delay time over the CP length, ISI is caused as a result. Consequently, although the BER performances are improved by FDE, the BER performances become poor compared to a case where there are no such delay waves. To be more specific, if the BER performances of a control channel degrade, the BER performances of a data channel subjected to reception processing using information of the control channel degrade together. Consequently, it is important to provide a method of preventing ISI in the control channel rather than the data channel.

In view of the above, it is therefore an object of the present invention to provide a radio transmitting apparatus, radio receiving apparatus and data mapping method for maintaining good BER performances of important data such as control channel data.

Means for Solving the Problem

The radio transmitting apparatus of the present invention employs a configuration having: a mapping section that maps in a block first data and second data having a higher degree of significance than the first data; an attaching section that attaches to a head of the block in which the first data and the second data are mapped, the tail end part of the block as a CP; and a transmitting section that transmits the block with the CP, in which the mapping section maps the second data in a central part in the block.

Advantageous Effect of the Invention

According to the present invention, when both first data and second data having a higher degree of significance than the first data are mapped in one block, it is possible to maintain good BER performances of the second data.

BEST MODE FOR CARRYING OUT THE INVENTION

Embodiments of the present invention will be explained below in detail with reference to the accompanying drawings.

(Embodiment 1)

Figure 1:
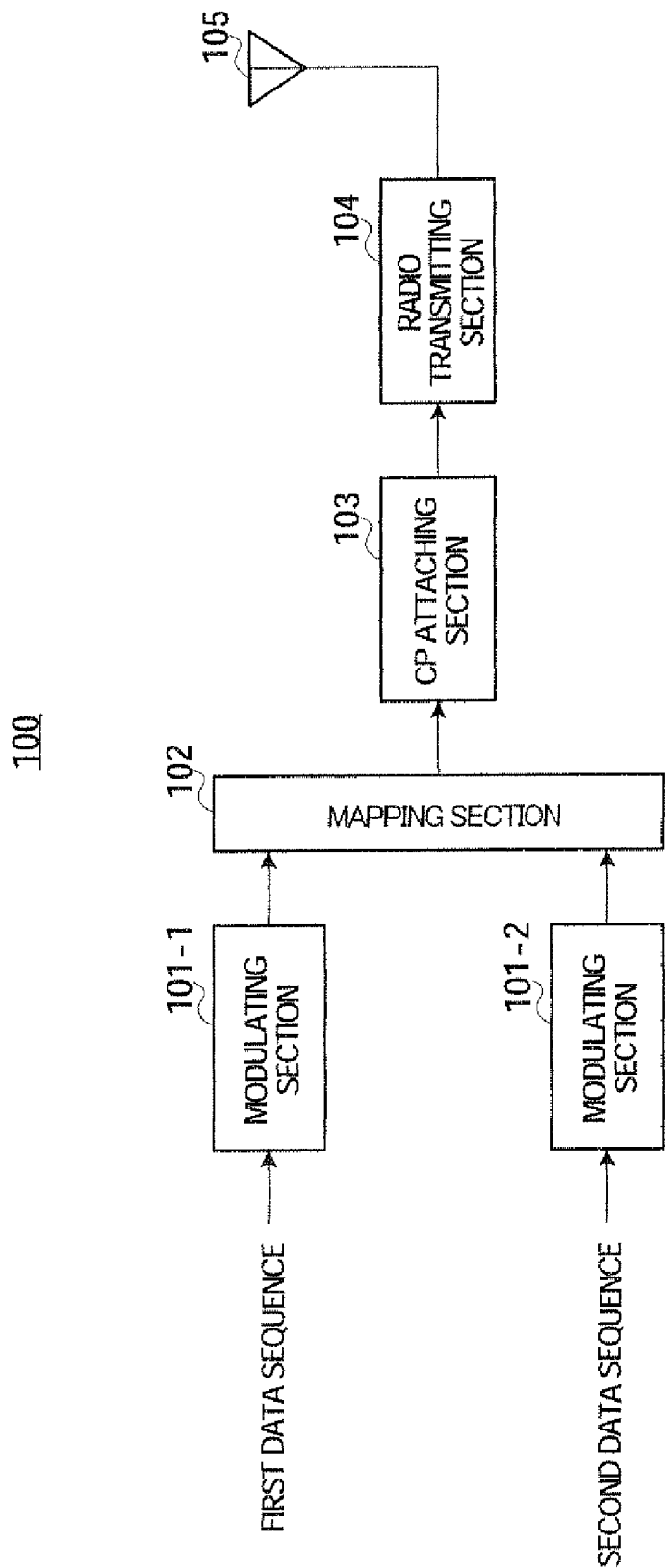
FIG. 1 is a block diagram showing a configuration of a radio transmitting apparatus according to Embodiment 1 of the present invention.
Figure 2:
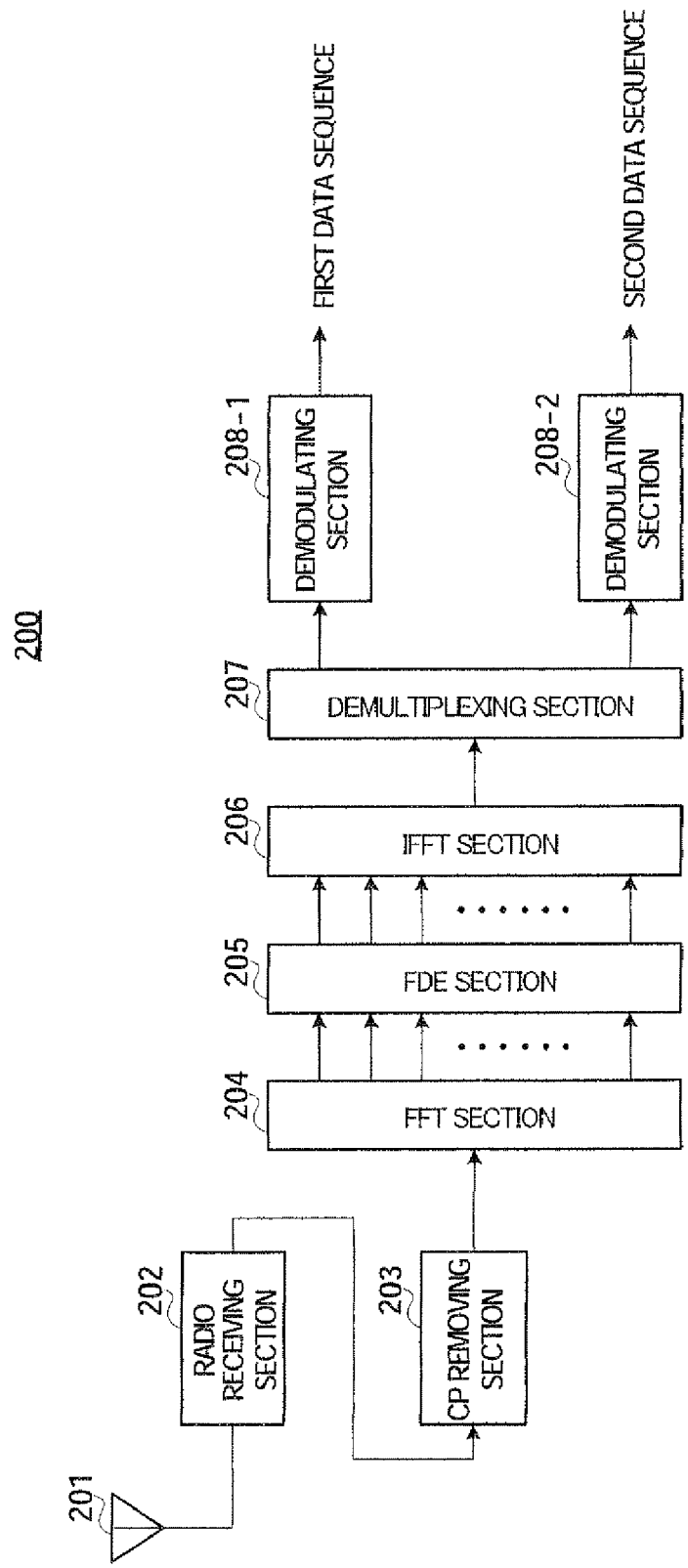
FIG. 2 is a block diagram showing a configuration of a radio receiving apparatus according to Embodiment 1 of the present invention.

In the present embodiment, a radio transmitting apparatus transmits a single carrier signal with CP to a radio receiving apparatus, and the radio receiving apparatus performs FDE for this transmitted single carrier signal. Further, the radio receiving apparatus maps both first data and second data having a higher degree of significance than the first data in one block and transmits the block. For example, the first data is data of a data channel and the second data is data of a control channel. Configurations of the radio transmitting apparatus and the radio receiving apparatus according to the present embodiment will be explained below. FIG. 1 illustrates the configuration of radio transmitting apparatus 100 according to the present embodiment and FIG. 2 illustrates the configuration of radio receiving apparatus 200 according to the present embodiment.

In radio transmitting apparatus 100 shown in FIG. 1, modulating section 101-1 modulates a first data sequence to generate a first data symbol and modulating section 101-2 modulates a second data sequence to generate a second data symbol.

Mapping section 102 maps both first data symbol and second data symbol in blocks forming single carrier signals. For example, according to the subframe format of the 10 MHz band disclosed in 3GGP, TR25.814, the block length of each block is 600 symbol length (that is, one block is comprised of 600 symbols). Mapping processing in mapping section 102 will be described later in detail.

CP attaching section 103 attaches to the head of a block in which the first data symbol and the second data symbol have been mapped, the tail end part of the block as CP.

Radio transmitting section 104 performs radio transmission processing such as D/A conversion, amplification and up-conversion on blocks with CP, and transmits these blocks subjected to radio transmission processing to radio receiving apparatus 200 (shown in FIG. 2) from antenna 105. That is, radio transmitting section 104 transmits a single carrier signal with CP to radio receiving apparatus 200.

On the other hand, in radio receiving apparatus 200 shown in FIG. 2, radio receiving section 202 receives the single carrier signal via antenna 201 and performs radio reception processing such as down-conversion and A/D conversion on the single carrier signal. Here, the received single carrier signal is comprised of a plurality of blocks.

CP removing section 203 removes the CP from each block subjected to radio reception processing.

FFT section 204 performs an FFT on each block and acquires a plurality of frequency components. To be more specific, FFT section 204 divides each block into N orthogonal frequency components using an N-point FFT and outputs these frequency components to FDE section 205 in parallel.

FDE section 205 performs FDE for each frequency component by multiplying each frequency component with MMSE equalization weight. Each frequency component subjected to FDE is outputted to IFFT section 206 in parallel FDE processing in FDE section 205 will be described later. Here, MMSE equalization weight to be used is disclosed in, for example, "Takeda et al., The transmission performance with space and frequency-domain process for DS-CDMA; the institute of electronics, information and communication engineers technical report; RC2003-33, pages 21 to 25, 2003-05."

IFFT section 206 performs an IFFT for each frequency component subjected to FDE and acquires signal sequences after the FDE. To be more specific, IFFT section 206 converts frequency components subjected to FDE into signal sequences corresponding to N symbols using an N-point IFFT, and outputs blocks comprised of signal sequences corresponding to N symbols to demultiplexing section 207.

Demultiplexing section 207 demultiplexes each block after FDE into the first data symbol and the second data symbol. The first data symbol is inputted to demodulating section 208-1 and the second data symbol to demodulating section 208-2.

Demodulating section 208-1 demodulates the first data symbol to acquire a first data sequence. Further, demodulating section 208-2 demodulates the second data symbol to acquire a second data sequence.

Next, mapping processing in mapping section 102 of radio transmitting apparatus 100 will be explained below in detail.

Figure 3:
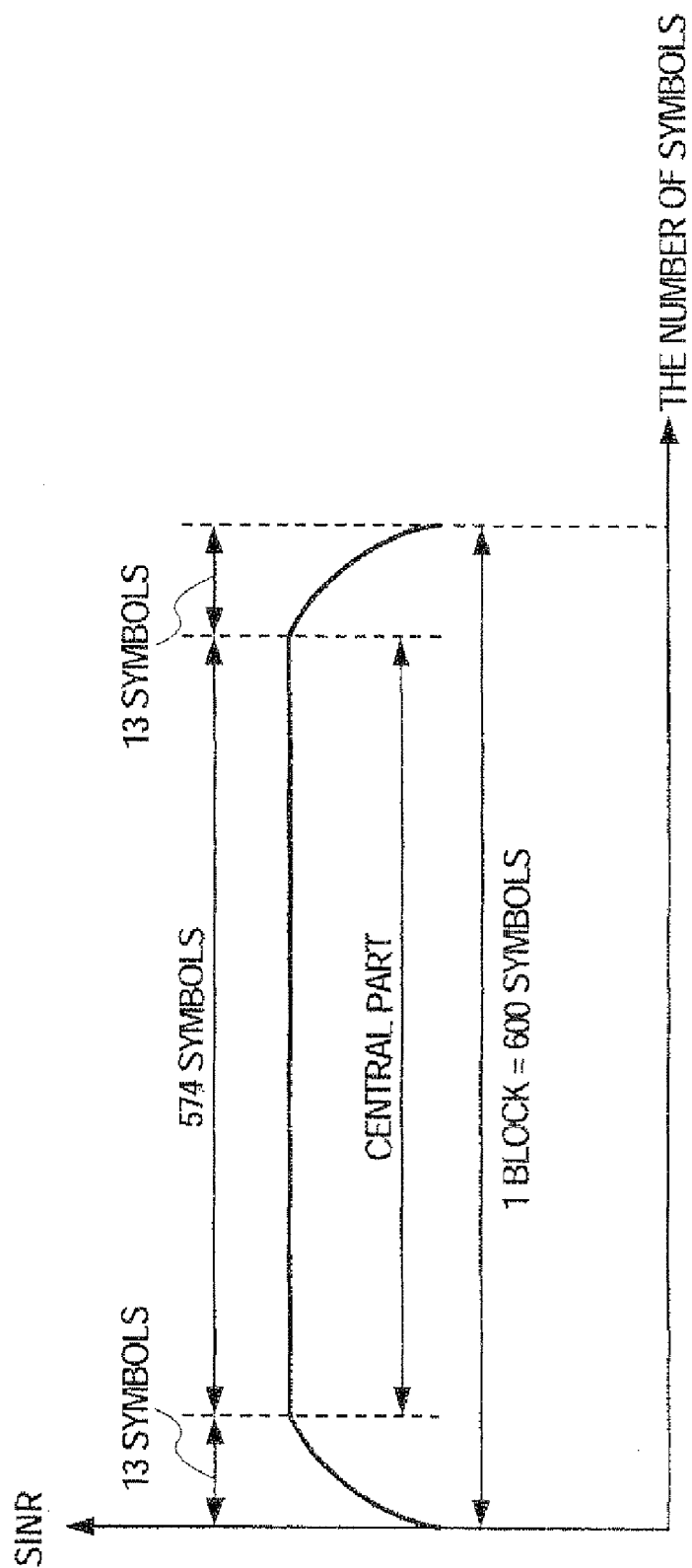
FIG. 3 illustrates a computer simulation result according to Embodiment 1 of the present invention.

According to a computer simulation performed by the present inventors, the SINR performances after FDE in one block are shown in FIG. 3 where there are delay waves with a delay time over the CP length in single carrier transmission. This simulation result shows that, when there are delay waves with a delay time over the CP length in single carrier transmission, SINR's of symbols are different from each other in one block, the SINR degrades significantly at both ends parts of the block due to ISI and the SINR of the central part of the block degrades a little due to ISI. This is because, in multi-carrier transmission such as orthogonal frequency division multiplexing (hereinafter "OFDM"), a plurality of symbols are mapped in the frequency domain, and, consequently, each symbol after FDE may be subject to the influence of ISI in a random manner, while, in single carrier transmission according to the present embodiment, a plurality of symbols are mapped in the time domain, and, consequently, the degree of the influence of ISI in both ends parts of the block is different from that in the central part.

Consequently, with the present embodiment, in one block, mapping section 102 maps first data in both ends parts of the block and second data having a higher degree of significance than the first data in the central part of the block. In other words, in one block, mapping section 102 maps the second data in a part where received quality is kept constant, and maps the first data in a part where received quality gradually degrades from that part of constant received quality. By this means, even when there are delay waves with a delay time over the CP length in single carrier transmission, it is possible to reduce the influence of ISI for the second data, suppress degradation of received quality of the second data and maintain good BER performances of the second data.

Here, in path models of PS, PB, VA and TU, both ends parts of the block have a symbol length of "the maximum delay time of delay waves–the CP length", and the central part is the part in one block excluding the symbol length of "the maximum delay time of delay waves–the CP length" from the both ends. For example, when the TU model is assumed to be used in the subframe format in the 10 MHz band disclosed in above-described 3GPP, TR25.814, as shown in FIG. 3, in one block comprised of 600 symbols, 13 symbols at both ends parts each are symbols of "the maximum delay time of delay waves–the CP length" and the remaining 574 symbols are the length of the central part.

Here, parts in the central part close to ends may be subject to the influence of ISI a little. Therefore, in one block, mapping section 102 may preferably map the second data in order from the center of the block (300 symbols from each end of the block in FIG. 3) to both ends.

In the following explanations, the first data is shared data channel (hereinafter "SDCH") data and the second data is shared control channel (hereinafter "SCCH") data, for example.

SCCH data is control information for demodulating SDCH, and is more important data requiring higher quality than SDCH data.

Figure 4:
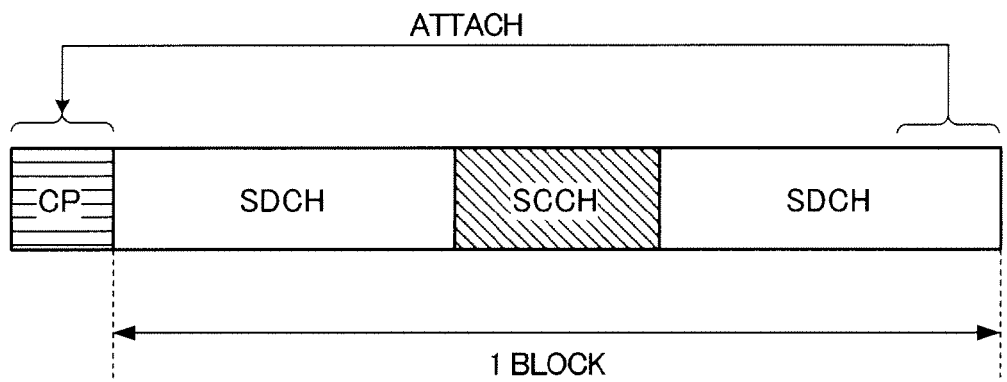
FIG. 4 shows an example of data mapping according to Embodiment 1 of the present invention.

Thus, as shown in FIG. 4, in one block, mapping section 102 of radio transmitting apparatus 100 maps SCCH data in a central part and SDCH data in both ends parts. Here, part of the tail end of the following SDCH data is attached to the head of the block as CP.

Figure 5:
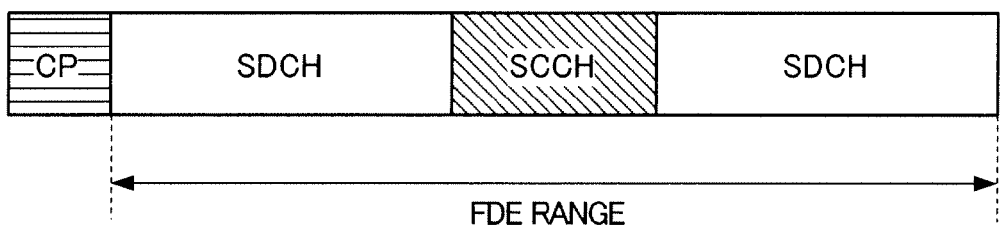
FIG. 5 shows an example of FDE according to Embodiment 1 of the present invention.

On the other hand, as shown in FIG. 5, FDE section 205 of radio receiving apparatus 200 performs FDE for the SCCH data mapped in the central part of the block in an FDE range of one block.

As described above, according to the present embodiment, in one block, first data is mapped in both ends parts of the block and second data, having a higher degree of significance than the first data, is mapped in the central part of the block, so that it is possible to maintain good BER performances of the second data even when there are delay waves with a delay time over the CP length in single carrier transmission.

(Embodiment 2)

According to the present embodiment, in the same second data generated by using a repetition technique, one is mapped in the central part of the block and the other is mapped in the tail end part of the block.

Here, the repetition technique refers to a technique of generating a plurality of the same symbols by duplicating a symbol ("repetition"), mapping the plurality of the same symbols with respective times, and transmitting these mapped symbols. With this technique, it is possible to yield time diversity gain on the receiving side by combining these same symbols.

Figure 6:
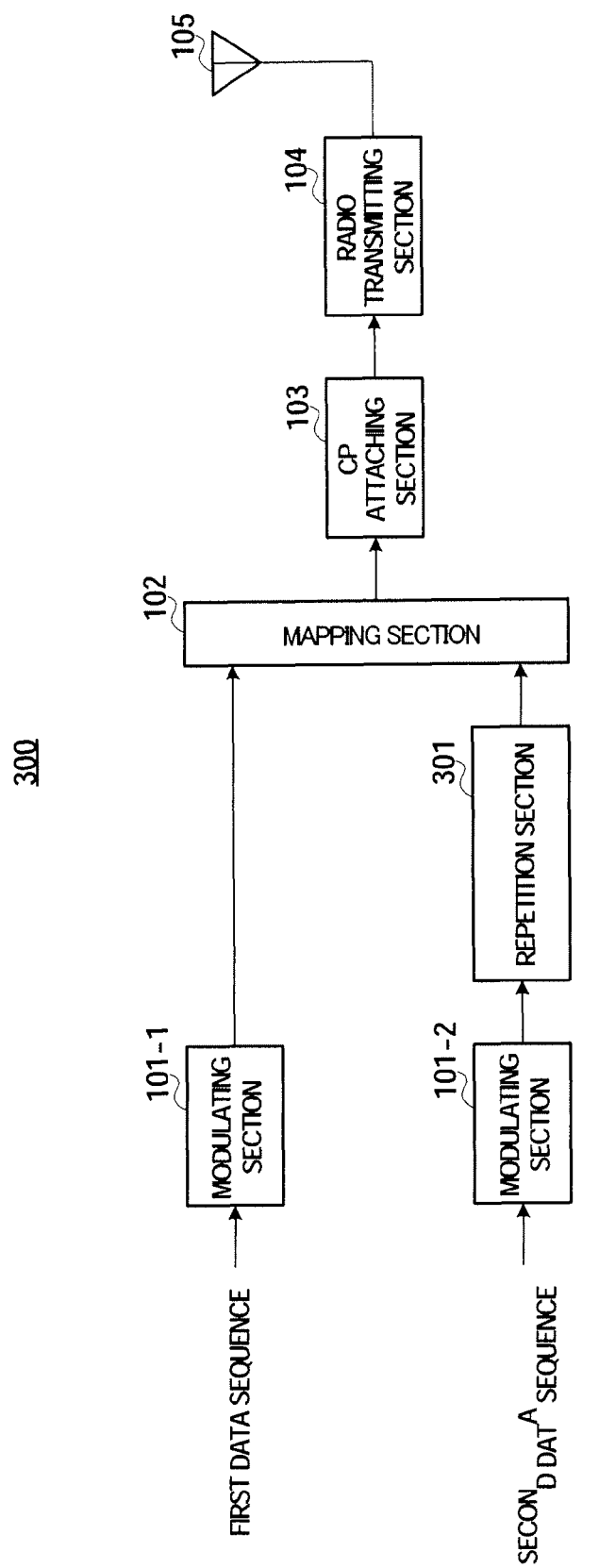
FIG. 6 is a block diagram showing a configuration of a radio transmitting apparatus according to Embodiment 2 of the present invention.
Figure 7:
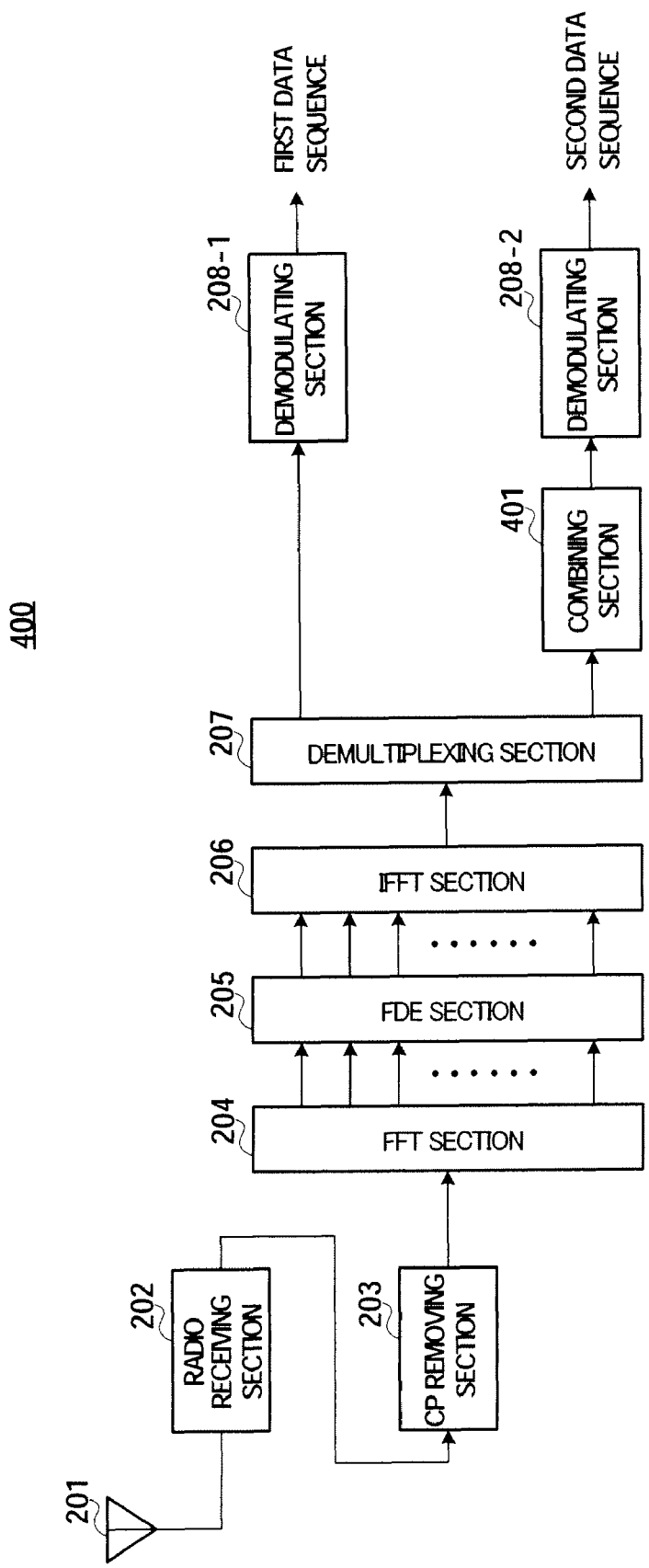
FIG. 7 is a block diagram showing a configuration of a radio receiving apparatus according to Embodiment 2 of the present invention.

FIG. 6 illustrates the configuration of radio transmitting apparatus 300 according to the present embodiment and FIG. 7 illustrates the configuration of radio receiving apparatus 400 according to the present embodiment. In FIGS. 6 and 7, the same components as in Embodiment 1 (that is, FIGS. 1 and 2) are assigned the same reference numerals and detailed explanations thereof will be omitted.

In radio transmitting apparatus 300 shown in FIG. 6, repetition section 301 generates a plurality of the same data symbols by duplicating a second data symbol ("repetition") to be inputted from modulating section 101-2, and outputs the plurality of the same second data symbols to mapping section 102. Here, these plurality of the same data symbols form a unit referred to as a "repetition unit."

On the other hand, in radio receiving apparatus 400 shown in FIG. 7, combining section 401 combines the second data symbols inputted from demultiplexing section 207 on a per repetition unit basis, and outputs combined symbols to demodulating section 208-2.

As in the case of the above, processing in mapping section 102, FDE section 205 and combining section 401 according to the present embodiment will be explained below using SDCH data as the first data and SCCH data as the second data, for example. Here, with the present embodiment, the number of repetitions, RF (Repetition Factor), is two. That is, a case will be explained below where the two same SCCH data are mapped in one block.

Figure 8:
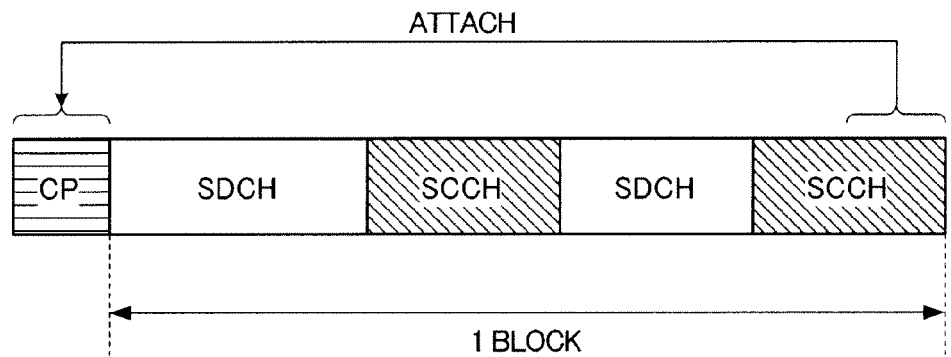
FIG. 8 shows an example of data mapping according to Embodiment 2 of the present invention.

As shown in FIG. 8, in one block, mapping section 102 of radio transmitting apparatus 300 maps one SCCH data in the central part of the block and maps the other SCCH data in the tail end part of the block. Further, mapping section 102 maps SDCH data in the rest of the block. Further, mapping section 102 maps part of the tail end of the SCCH data mapped in the tail end of the block, to the head of the block as CP.

Figure 9:
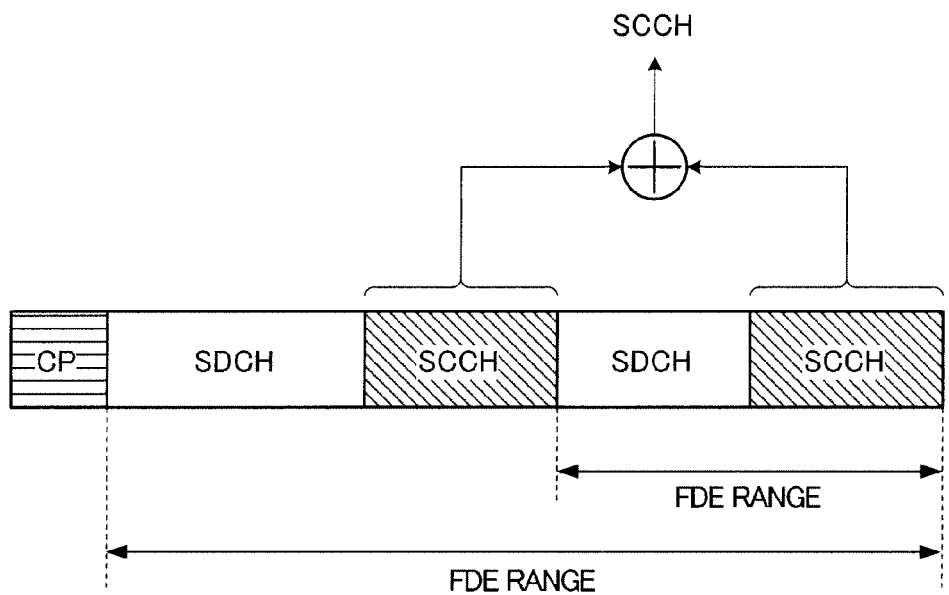
FIG. 9 shows an example of FDE according to Embodiment 2 of the present invention.

On the other hand, as shown in FIG. 9, FDE section 205 of radio receiving apparatus 400 performs FDE for one SCCH data mapped in the central part of the block in an FDE range of one block. Further, FDE section 205 recognizes the SCCH data mapped in the central part of the block as CP and performs FDE for the other SCCH data mapped in the tail end part of the block in an FDE range of the interval between the head of the SDCH data immediately after the SCCH data mapped in the central part, and the tail end of the block. That is, FDE section 205 performs FDE for the SCCH data mapped in the tail end part of the block in a shorter FDE range than the SCCH data mapped in the central part of the block. Next, combining section 401 combines the two same SCCH data subjected to FDE and improves received quality of SCCH data. Here, the CP part is a part of the SCCH data, and, consequently, combining section 401 may further combine the CP part with two SCCH data. Thus, by combining the CP part, it is possible to further improve received quality of SCCH data.

As described above, according to the present embodiment, it is possible to reduce the influence of ISI for second data mapped in the central part of a block and further improve received quality of the second data by combining the same second data subjected to FDE. Furthermore, the second data mapped in the central part of the block can be regarded as CP and FDE can be performed for the second data mapped in the tail end part of the block in a shorter FDE range, so that it is possible to reduce the influence of time fading with respect to the second data mapped in the tail end part of the block.

(Embodiment 3)

The present embodiment is different from Embodiment 2 in that one second data is mapped in the central part of a block such that the tail end of the second data is aligned to a half position of the block.

In the following explanation, as in Embodiment 2, the first data is SDCH data and the second data is SCCH data, for example. Further, similar to Embodiment 2, RF is 2 in the following explanations.

Figure 10:
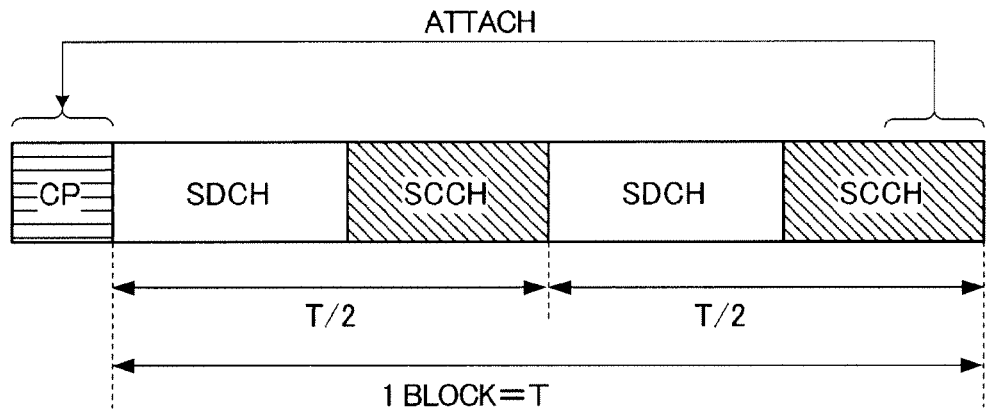
FIG. 10 shows example 1 of data mapping according to Embodiment 3 of the present invention.

As shown in FIG. 10, in one block, upon mapping one SCCH data in the central part of the block, mapping section 102 of radio transmitting apparatus 300 maps the SCCH data such that the tail end of the SCCH data is aligned to a half (T/2) position of one block (T). The rest is the same as in Embodiment 2.

Figure 11:
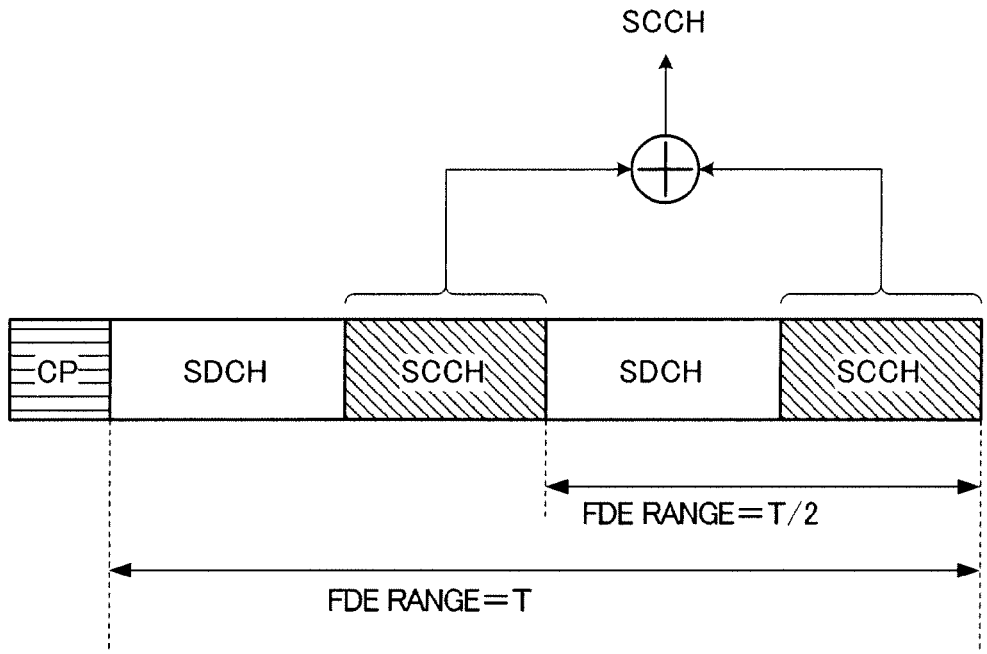
FIG. 11 shows example 1 of FDE according to Embodiment 3 of the present invention.

On the other hand, as shown in FIG. 11, similar to Embodiment 3, FDE section 205 of radio receiving apparatus 400 performs FDE for one SCCH data mapped in the central part of a block in an FDE range of one block (T). However, FDE section 205 is different from Embodiment 3 in performing FDE for the other SCCH data mapped in the tail end part of the block in an FDE range of a half interval (T/2 interval) of one block (T). The rest is the same as in Embodiment 2.

As described above, according to the present embodiment, by setting the FDE ranges of one block T and half block T/2, these FDE ranges can be adjusted to the squares of two, so that it is possible to perform an FFT and IFFT for the second data mapped in the tail end of the block. By this means, it is possible to perform higher-speed FDE processing on the second data mapped in the tail end of the block.

Although RF is 2 in the above example, RF may be 3 or more. In particular, to adjust the FDE range to the squares of two, RF may preferably be the squares of two.

Figure 12:
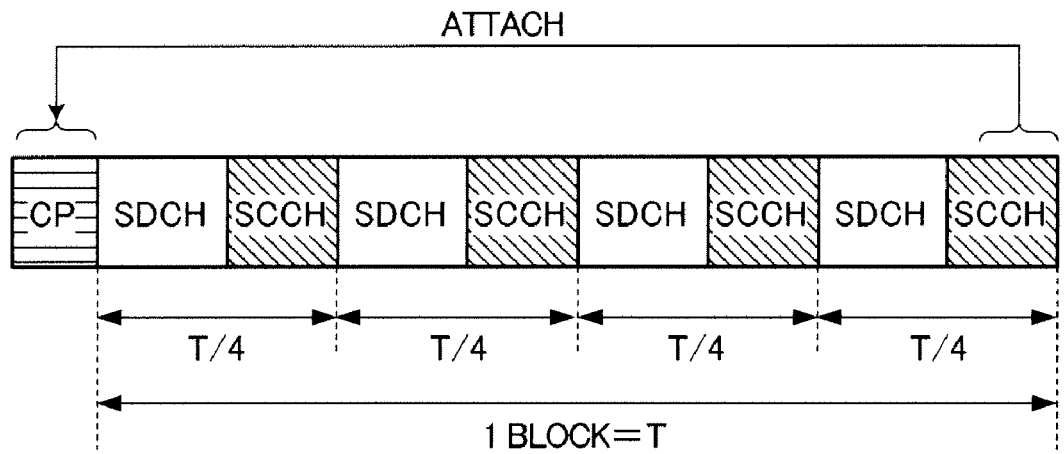
FIG. 12 shows example 2 of data mapping according to Embodiment 3 of the present invention.

For example, when RF is 4, as shown in FIG. 12, mapping section 102 further maps each SCCH data such that the tail end of one SCCH data is aligned to one quarter (T/4) position of one block (T) and other SCCH data is aligned to three quarters (3T/4) position of one block in addition to the structure shown in FIG. 10.

Figure 13:
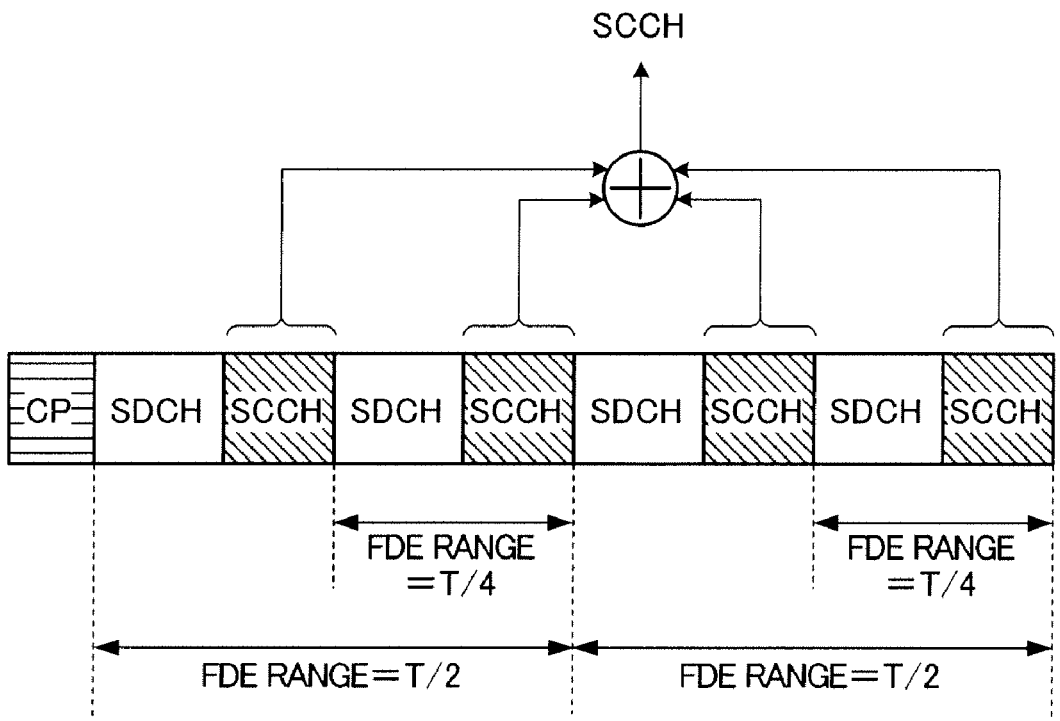
FIG. 13 shows example 2 of FDE according to Embodiment 3 of the present invention.

On the other hand, as shown in FIG. 13, first, FDE section 205 performs FDE for the first SCCH data and the third SCCH data in an FDE range of a half interval (T/2) of one block (T), and performs FDE for the second SCCH data and the fourth SCCH data in an FDE range of one quarter interval (T/4) of one block (T).

Thus, by increasing RF, the number of SCCH data combined is increased, so that it is possible to improve received quality of SCCH data.

(Embodiment 4)

The present embodiment is the same as Embodiment 2 in generating the same second data by repetition, and is different from Embodiment 2 in generating a block in which second data is mapped in a similar manner to Embodiment 1 every several blocks.

In the following explanation, as in Embodiment 2, the first data is SDCH data and the second data is SCCH data, for example. Further, similar to Embodiment 2, RF is 2 in the following explanations.

Figure 14:
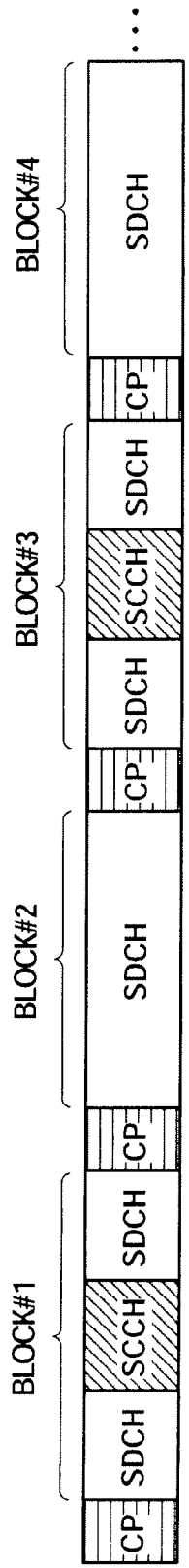
FIG. 14 shows an example of data mapping according to Embodiment 4 of the present invention.

As shown in FIG. 14, in blocks #1 to #4, mapping section 102 of radio transmitting apparatus 300 maps the same SCCH data in blocks #1 and #3 in a similar manner to Embodiment 1, and does not map SCCH data in blocks #2 and #4. That is, mapping section 102 maps the same SCCH data in respective central parts of blocks #1 and #3 which are not adjacent to each other. By this means, it is possible to generate a block in which SCCH data is mapped in the central part every two blocks and transmit the SCCH data.

Figure 15:
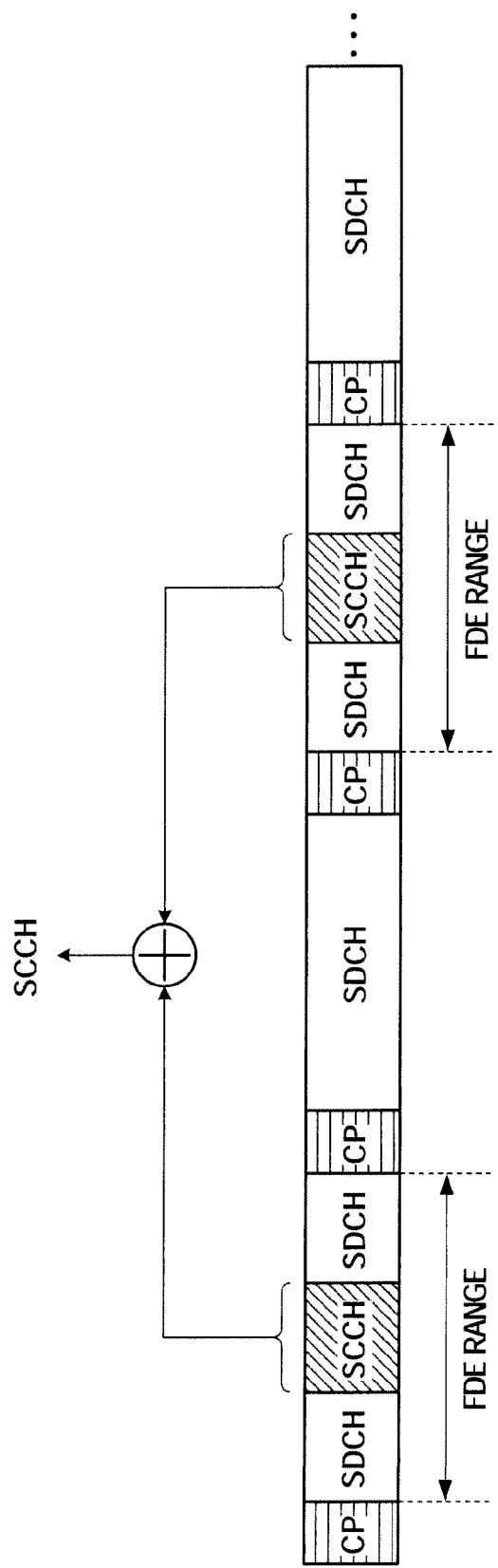
FIG. 15 shows an example of FDE according to Embodiment 4 of the present invention.

On the other hand, as shown in FIG. 15, FDE section 205 of radio receiving apparatus 400 performs FDE for the SCCH data mapped in the central parts of blocks #1 and #3 in an FDE range of one block length. Next, combining section 401 combines the two same SCCH data subjected to FDE and improves received quality of SCCH data.

As described above, according to the present embodiment, the same second data is mapped in blocks that are apart from each other in the time domain, and, consequently, time diversity gain is yielded by combining these second data, so that it is possible to improve received quality of second data.

(Embodiment 5)

The present embodiment is the same as Embodiment 2 in generating the same second data by repetition, and is different from Embodiment 2 in mapping the second data in tail end parts of two consecutive blocks and performing FDE in an FDE range of these two consecutive blocks as a unit.

In the following explanation, as in Embodiment 2, the first data is SDCH data and the second data is SCCH data, for example. Here, as in Embodiment 2, RF is 2 in the following explanations.

Figure 16:
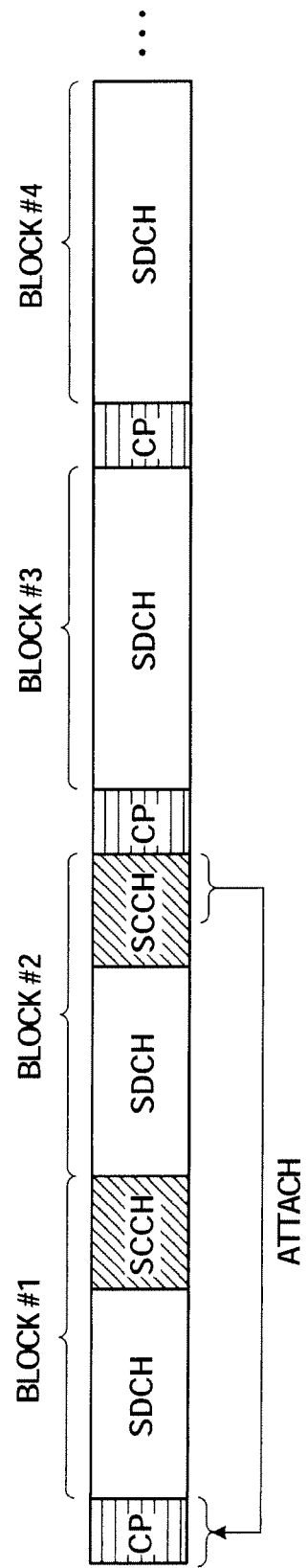
FIG. 16 shows an example of data mapping according to Embodiment 5 of the present invention.

As shown in FIG. 16, in blocks #1 to #4, mapping section 102 of radio transmitting apparatus 300 maps the same SCCH data in tail end parts of consecutive blocks #1 and #2.

Here, the SCCH data mapped in block #1 can be regarded as CP of the SCCH data mapped in block #2, and, consequently, CP does not need to be attached to block #2. Therefore, with the present embodiment, CP is not attached to block #2. Thus, by decreasing the number of CPs, it is possible to transmit other data corresponding to the number of decreased CPs and improve transmission efficiency. Further, it is also possible to increase the time length of other CPs corresponding to the number of decreased CPs with the transmission efficiency maintained, and improve the resistance to delay waves. Thus, according to the present embodiment, part of the tail end of the SCCH data mapped in the tail end of block #2, is attached to the head of block #1 as a CP. Further, according to the present embodiment, compared to the CP attached per block, CP with double time length is attached to the head of block #1.

Figure 17:
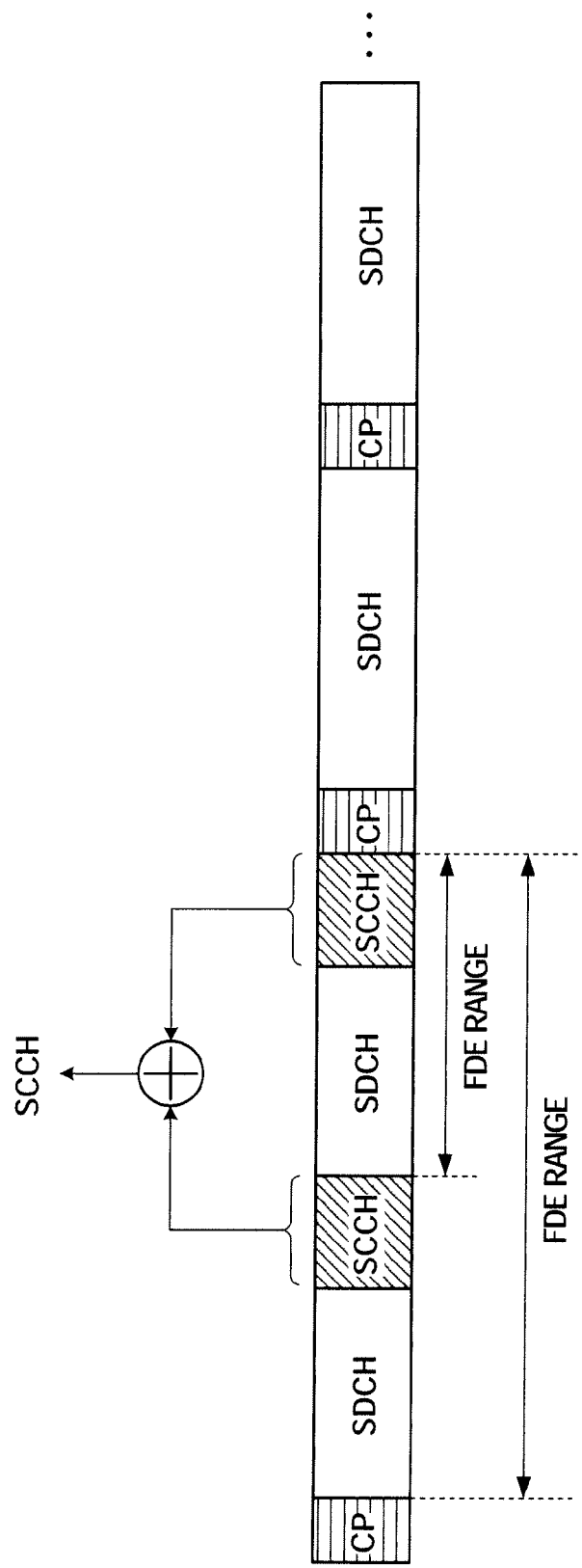
FIG. 17 shows an example of FDE according to Embodiment 5 of the present invention.

By contrast, as shown in FIG. 17, FDE section 205 of radio receiving apparatus 400 performs FDE for the SCCH data mapped in the tail end part of block #1 in an FDE range of blocks #1 and #2 as a unit. That is, FDE section 205 performs FDE for SCCH data mapped in the tail end part of block #1 in an FDE range of twice as long as one block length (that is, two block length). Further, FDE section 205 performs FDE for SCCH data mapped in the tail end part of block #2 in an FDE range of one block. Next, combining section 401 combines the two same SCCH data subjected to FDE and improves received quality of SCCH data.

As described above, according to the present embodiment, transmission efficiency can be maintained and the CP length can be increased, so that it is possible to improve the resistance to delay waves without degrading transmission efficiency.

Thus, embodiments of the present invention have been explained.

Here, when error correcting coding is performed using systematic codes such as Turbo code and LDPC code, systematic bits representing transmission bits and parity bits representing redundant bits are generated. Although the BER performances degrade significantly if the systematic bit has error, even if some parity bit has error, it is possible to maintain predetermined BER performances. That is, systematic bits have a higher degree of significance than parity bits. Therefore, in each embodiment of the present invention, data comprised of parity bits may be the first data, and data comprised of systematic bits may be the second data.

Further, if received quality of a pilot used for channel estimation and path search degrades, the accuracy of channel estimation and the accuracy of path search degrade, and consequently, with the degradation, the accuracy of demodulation of all other data degrades. That is, a pilot has a higher degree of significance than all the other data. Therefore, in each embodiment described above, a pilot may be the first data and data other than the pilot may be the second data.

Further, the present invention is not limited to MMSE-FDE, and is also applicable to other FDE such as ZF-FDE.

Further, the radio transmitting apparatus and radio receiving apparatus according to each embodiment described above can be provided for a radio communication mobile station apparatus and radio communication base station apparatus used in a mobile communication system, and the radio communication mobile station apparatus and radio communication base station apparatus can transmit the second data having a higher degree of significance than the first data in one block and mapped in the central part of the block. Here, the radio communication mobile station apparatus can be represented by UE, and the radio communication base station apparatus can be represented by Node B.

In the present embodiment, although the present invention is configured with hardware as an example, the present invention can also be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-270423, filed on Sep. 16, 2005, the entire content of which is expressly incorporated by reference herein.

Industrial Applicability

The present invention is applicable to, for example, a mobile communication system.

The invention claimed is:

1. A radio transmission apparatus comprising:
a mapping section that maps first data of a data channel in a block, and maps second data of a control channel in a central part of the block;
an attaching section that attaches to a head of the block, in which the first data and the second data are mapped, a tail end part of the block as a cyclic prefix;
a transmission section that transmits the block with the cyclic prefix as a single carrier signal; and
a repetition section that generates third data, that is the same as the second data, by duplicating the second data,
wherein the mapping section maps the third data in central parts of a plurality of blocks that are not adjacent to each other.

2. The radio transmission apparatus according to claim 1, wherein each of the blocks has a length that corresponds to a frequency domain equalization range.

3. A radio transmission apparatus comprising:
a mapping section that maps first data comprising parity bits in a block, and maps second data comprising systematic bits in a central part of the block;
an attaching section that attaches to a head of the block, in which the first data and the second data are mapped, a tail end part of the block as a cyclic prefix;
a transmission section that transmits the block with the cyclic prefix as a single carrier signal; and
a repetition section that generates third data, that is the same as the second data, by duplicating the second data,
wherein the mapping section maps the third data in central parts of a plurality of blocks that are not adjacent to each other.

4. The radio transmission apparatus according to claim 3, wherein each of the blocks has a length that corresponds to a frequency domain equalization range.

5. A transmission method performed by a radio transmission apparatus, the method comprising:
mapping first data of a data channel in a block, and second data of a control channel in a central part of the block;
attaching to a head of the block, in which the first data and the second data are mapped, a tail end part of the block as a cyclic prefix;
transmitting the block with the cyclic prefix as a single carrier signal; and
generating third data, that is the same as the second data, by duplicating the second data,
wherein the third data is mapped in central parts of a plurality of blocks that are not adjacent to each other.

6. A transmission method performed by a radio transmission apparatus, comprising:
mapping first data comprising parity bits in a block, and second data comprising systematic bits in a central part of the block;
attaching to a head of the block, in which the first data and the second data are mapped, a tail end part of the block as a cyclic prefix;
transmitting the block with the cyclic prefix as a single carrier signal; and
generating third data, that is the same as the second data, by duplicating the second data,
wherein the third data is mapped in central parts of a plurality of blocks that are not adjacent to each other.

* * * * *